United States Patent
Bigot-Astruc et al.

(10) Patent No.: US 7,428,361 B2
(45) Date of Patent: Sep. 23, 2008

(54) CHROMATIC DISPERSION COMPENSATING AND CHROMATIC DISPERSION SLOPE COMPENSATING FIBER

(75) Inventors: Marianne Bigot-Astruc, Le Chesnay (FR); Pierre Sillard, Le Chesnay (FR); Louis-Anne De Montmorillon, Paris (FR); Denis Molin, Draveil (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/422,783

(22) Filed: Jun. 7, 2006

(65) Prior Publication Data

US 2007/0140635 A1      Jun. 21, 2007

(30) Foreign Application Priority Data

Jun. 14, 2005 (FR) .................................. 05 06009

(51) Int. Cl.
*G02B 6/036*     (2006.01)
*G02B 6/02*      (2006.01)

(52) U.S. Cl. ....................................... 385/126; 385/127
(58) Field of Classification Search ........................ None
See application file for complete search history.

(56) References Cited

U.S. PATENT DOCUMENTS 6,587,627 B2     7/2003   Saitou et al.
6,782,172 B2 *   8/2004   Hirano et al. ............... 385/123
6,937,805 B2 *   8/2005   Aikawa et al. .............. 385/123
2004/0234219 A1  11/2004  Aikawa et al.

FOREIGN PATENT DOCUMENTS

| EP | 1 170 604 A2 | 1/2002 |
|----|---|---|
| EP | 1 308 756 A1 | 5/2003 |
| JP | 2003-270471 | 9/2003 |
| WO | WO 01/71391 A2 | 9/2001 |
| WO | WO 03/050577 A1 | 6/2003 |
| WO | WO 03/050578 A1 | 6/2003 |

\* cited by examiner

*Primary Examiner*—Rodney Bovernick
*Assistant Examiner*—Omar Rojas
(74) *Attorney, Agent, or Firm*—Sughrue Mion, PLLC

(57) ABSTRACT

A chromatic dispersion compensating and dispersion slope compensating optical fiber comprises a central core having an index difference $\Delta n_1$ with an outer optical cladding, a first buried inner cladding having an index difference $\Delta n_2$ with the outer cladding, a ring having an index difference $\Delta n_3$ with the outer cladding and a second buried inner cladding having an index difference $\Delta n_4$ with the outer cladding. The index difference between the first buried inner cladding and the outer cladding $\Delta n_2$ is less than or equal to $-13.5 \cdot 10^{-3}$ and the index difference between the second buried inner cladding and the outer cladding $\Delta n_4$ is less than or equal to $-3 \cdot 10^{-3}$. The fiber has, for a wavelength of 1550 nm, a chromatic dispersion less than or equal to $-50$ ps/nm/km and a ratio of the chromatic dispersion over the chromatic dispersion slope DOS less than or equal to 70 nm. The second deeply buried inner cladding allows obtaining a low DOS value whilst maintaining acceptable optical characteristics.

17 Claims, 3 Drawing Sheets

CHROMATIC DISPERSION COMPENSATING AND CHROMATIC DISPERSION SLOPE COMPENSATING FIBER

BACKGROUND OF THE INVENTION

The invention relates to the field of optical fiber transmission, and more specifically, the chromatic dispersion compensation and the chromatic dispersion slope compensation in transmission systems by optical fiber.

For the optical fibers, generally the index profile is qualified as a function of the shape of the graph of the function which links a radius of the fiber to the refractive index. In a standard manner abscises represent the distance r to the centre of the fiber and ordinates represent the difference between the refractive index and the refractive index of the fiber cladding. It is thus referred to the index profile as "step", "trapezoid" or "triangle" for graphs which have step, trapezoid or triangle respective shapes. These curves are generally representative of the theoretical shape or reference profile of the fiber, the fiber manufacturing constraints can lead to a substantially different profile.

An optical fiber is typically composed of an optical core, having the function of transmitting and possibly amplifying an optical signal, and an optical cladding, having the function of confining the optical signal in the core. For this reason, the refractive indexes of the core $n_c$ and of the outer cladding $n_g$ are such that $nc > n_g$. As commonly known, the propagation of an optical signal in a single-mode optical fiber is divided in a guided fundamental mode in the core and into guided secondary modes over a certain distance throughout the core-cladding assembly, called cladding modes.

In new high bit-rate wavelength-division-multiplexing transmission networks, it is advantageous to manage the chromatic dispersion, notably for bit rates greater than or equal to 40 Gbit/s. The purpose is to obtain, for all the wavelength values of the multiplex, a substantially nil cumulated chromatic dispersion over the link so as to limit the broadening of pulses. "Cumulated chromatic dispersion" is called the integral of the chromatic dispersion over the length of the fiber; with constant chromatic dispersion, the cumulated chromatic dispersion is equal to the product of the chromatic dispersion and the fiber length. A cumulated value of a few tens of ps/nm for the dispersion is usually acceptable. It is also beneficial to avoid, in the vicinity of wavelengths used in the system, nil values of the local chromatic dispersion, for which the non-linear effects are more important. Finally, it is also advantageous to limit the cumulated chromatic dispersion slope over the multiplex range so as to avoid or limit the distortions between the multiplex channels. This slope is usually the derivative of the chromatic dispersion in relation to the wavelength.

Typically single-mode fibers (SMF) with step index profiles or dispersion shifted fibers, also known as non-zero dispersion shifted fiber (NZDSF+) as line fiber for fiber-optic transmission systems. NZDSF+ is qualified as dispersion shifted fibers having a non-zero and positive chromatic dispersion for the wavelengths for which they are used, typically about 1550 nm. These fibers have, for these wavelengths, a low chromatic dispersion typically less than 10 ps/(nm.km) at 1550 nm and a chromatic dispersion slope between 0.04 and 0.1 ps/(nm².km).

To compensate for the chromatic dispersion and the chromatic dispersion slope in SMF and NZDSF+ fibers used as line fibers, one can use small lengths of dispersion compensating fiber (DCF). In the choice of DCF fiber, one tries to get the ratio of the chromatic dispersion over the dispersion slope of the compensating fiber to be substantially equal to that of the line fiber. This ratio is designated dispersion over slope ratio (DOS). The smaller the DOS ratio is of a transmission fiber the harder it is to compensate the dispersion and the dispersion slope with a single compensating fiber DCF. Yet, some NZDSF fibers, for example the fiber sold by the Corning company under the e-leaf® brand, have a very small DOS, of about 50 nm. As these line fibers are used in high bit rate long distance transmissions, it is important to be able to compensate the cumulated chromatic dispersion of these fibers with a compensation fiber having a similarly small DOS value. Yet, such a DOS value, as small as 50 nm, is difficult to attain in a DCF fiber.

For example, U.S. Pat. No. 6,587,627 proposes a compensating fiber profile with a central core, a buried inner cladding, a ring and an outer cladding, having a DOS value at 1600 nm of about 60 nm that can attain 50 nm. This type of profile either has the inconvenience of too great a chromatic dispersion at 1550 nm, greater than −50 ps/nm/km, or too great a DOS value at 1550 nm, greater than 70 nm.

WO-A-03/050577 proposes a compensating fiber profile with a central core, a buried inner cladding, a ring and an outer cladding, having a DOS value at 1550 nm of about 50 nm. This profile type does not allow to attain acceptable bending losses for putting into module.

WO-A-03/050578 proposes a compensating fiber profile with a central core, a buried inner cladding, a landing, a ring and an outer cladding, having a DOS value of between 60 and 115 nm for wavelengths of between 1550 and 1610 nm. This profile type has the inconvenience of high cut-off wavelengths; far greater than 1650 nm.

US-2004/0234219 proposes a dispersion compensating optical fiber with a central core, a first burried inner cladding, a ring and a second shallowly burried inner cladding and a outer cladding.

JP-2003/270471 proposes a dispersion compensating optical fiber with a central core, a first burried inner cladding, a ring and a second shallowly burried inner cladding and a outer cladding.

WO-A-01/71391 proposes a compensating fiber profile with a central core, a buried inner cladding, a ring and an outer cladding, having a DOS value at 1550 nm of between 40 and 100 nm. This profile type has the inconvenience of high cut-off wavelengths; far greater than 1650 nm.

Furthermore, EP-A-1 308 756 discloses a compensating fiber profile with a central core, a first buried inner cladding, a ring, a second buried inner cladding and an outer cladding, having certain DOS values close to 50 nm at 1550 nm. This profile type has the inconvenience of too high a chromatic dispersion, greater than −50 ps/nm/km, and does not allow to attain the desired compromise, notably between effective surface and bending losses.

EP-A-1 170 604 discloses a compensating fiber profile with a central core, a first buried inner cladding, a ring, a second buried inner cladding and an outer cladding, having a DOS value at 1550 nm between 30 and 66 nm. The proposed fibers do not allow to attain the desired compromise because the second buried inner cladding is insufficiently buried; notably this fiber profile does not allow to obtain acceptable bending losses for the desired characteristics.

It is noticed that the majority of the disclosed profiles of the fibers do not enable to easily attain a DOS value as small as 50 nm.

Moreover, it is noticed that the DCF compensating fibers, having a small DOS, are not optimised in order to be used in dispersion compensating modules. These dispersion compensating modules are generally placed in optical repeaters along the transmission line; the DCF compensating fiber is coiled in the module and is to compensate the cumulated dispersion and the cumulated dispersion slope over several hundred kilometres in the line fiber. Yet, the DCF compensating fibers having a small DOS often have high bending losses and/or a high cut-off wavelength and/or a small effective surface and/or a small figure of merit (FOM).

None of the profiles of the fibers of the prior art cited and analysed above attain an optimal compromise between a limited DOS value and acceptable figure of merit, bending losses, cut-off wavelength and effective surface characteristics.

The majority of currently commercialised modules for compensating chromatic dispersion over the C band of a line fiber having a small DOS, of about 50 nm, comprise a DCF compensating fiber with a higher DOS, of about 60 or 70 nm coupled to an additional fiber of SMF type in order to increase the global DOS of the line fiber to compensate it. Such a solution is unsatisfactory as it consists in degrading the losses, the polarisation mode dispersion (PMD) and the behavior of the non-linear effects of the module in order to improve the chromatic dispersion compensation and the dispersion slope compensation of the line fiber by the same module. Furthermore, this solution complicates the manufacturing of modules, increases their manufacturing cost and renders them non-symmetric.

There is therefore a need for a chromatic dispersion compensating fiber which has a small DOS value and that can be directly used in a compensating module without any additional fibers; that meaning a dispersion compensating fiber which has an optimal compromise between a small DOS and a high figure of merit, small bending losses, a small cut-off wavelength and an enlarged effective surface.

SUMMARY OF THE INVENTION

For this reason, the invention proposes a compensating fiber profile comprising a central core, a first deeply buried inner cladding in order to attain a sufficiently small DOS, a ring, a second deeply buried inner cladding in order to improve the desired compromise between the bending losses, the index difference between the central core and the first buried cladding, the effective surface and the cut-off wavelength, and an outer cladding. The profile according to the invention is such that the fiber has at 1550 nm a DOS value of about 50 nm, for a chromatic dispersion lying between −200 ps/nm/km and −100 ps/nm/km.

More specifically, the invention proposes a chromatic dispersion compensating and dispersion slope compensating optical fiber, comprising:
 a central core having an index difference $Dn_1$ with an outer optical cladding;
 a first buried inner cladding and having an index difference $\Delta n_2$ with the outer cladding;
 a ring having an index difference $\Delta n_3$ with the outer cladding;
 a second buried inner cladding and having an index difference $\Delta n_4$ with the outer cladding;
 in which the index difference between the first buried cladding and the outer cladding $\Delta n_2$ is less than or equal to $-13.5 \cdot 10^{-3}$ and the index difference between the second buried inner cladding and the outer cladding $\Delta n_4$ is less than or equal to $-3 \cdot 10^{-3}$;
  the fiber having, for a wavelength of 1550 nm:
  a negative chromatic dispersion less than or equal to 50 ps/nm/km; and a ratio of chromatic dispersion over the chromatic dispersion slope (DOS) less than or equal to 70 nm.

According to the embodiments, the fiber according to the invention has one or several of the following characteristics:
 the fiber has, for a wavelength of about 1550 nm, a chromatic dispersion less than or equal to −100 ps/nm/km;
 the fiber has, for a wavelength of about 1550 nm, a ratio of the chromatic dispersion over the chromatic dispersion slope (DOS) less than or equal to 55 nm;
 the index difference between the central core and the first buried inner cladding $\Delta ne_q = \Delta n_1 - \Delta n_2$ lies between $35 \cdot 10^{-3}$ and $51 \cdot 10^{-3}$;
 the fiber has, for the fundamental propagation mode, an effective surface greater than or equal to 12 $\mu m^2$;
 the fiber has, for the fundamental propagation mode, an effective surface greater than or equal to 14 $\mu m^2$;
 the fiber has an effective cut-off wavelength less than or equal to 1650 nm;
 the fiber has, for a wavelength of 1625 nm, bending losses over a curvature radius of 10 mm, less than or equal to 500 dB/m;
 the fiber has, for a wavelength of 1625 nm, bending losses over a curvature radius of 10 mm, less than or equal to 200 dB/m;
 the fiber has, for a wavelength of 1550 nm, a figure of merit greater than or equal to 100 ps/nm/dB;
 the fiber has, for a wavelength of 1550 nm, a figure of merit greater than or equal to 150 ps/nm/dB;
 the central core has a trapezoid shape;
 the central core has a step shape;
 the central core has an alpha shape.

The invention also proposes a transmission system, having:
 an optical signal transmitter in a predetermined range of wavelengths;
 a transmission optical fiber having in a predetermined range of wavelengths a positive chromatic dispersion and a positive chromatic dispersion slope with a ratio of the chromatic dispersion over the chromatic dispersion slope (DOS) less than or equal to 70 nm;
 a section of the compensating fiber according to the invention.

According to a characteristic, the transmission optical fiber is a NZDSF+ fiber.

The invention also proposes a chromatic dispersion compensating module for transmission optical fiber having in a predetermined range of wavelengths a positive chromatic dispersion and a positive chromatic dispersion slope with a ratio of chromatic dispersion over the chromatic dispersion slope (DOS) less than or equal to 70 nm, the module containing a single fiber consisting in a portion of the fiber according to the invention.

BRIEF DESCRIPTION OF THE DRAWINGS

Other characteristics and advantages of the invention will become clearer upon reading the description that follows of the embodiments of the invention, give by way of example and in reference to the annexed drawings, which illustrate.

DETAILED DESCRIPTION OF THE INVENTION

For positive cumulated chromatic dispersion compensation and positive cumulated chromatic dispersion slope compensation in a line optical fiber, with a ratio of the chromatic dispersion over the dispersion slope (DOS) of small value, of about 50 nm, the invention proposes to use a compensating optical fiber having a specific index profile with a first and second deeply buried inner cladding, allowing to attain a DOS value less than or equal to 70 nm for a chromatic dispersion less than or equal to −50 ps/nm/km.

The presence of a second deeply buried inner cladding allows to attain such a DOS value whilst maintaining acceptable figure of merit, bending losses, cut-off wavelength and effective surface characteristics.

Through a sufficiently deeply burying of the second buried cladding, also designated as a fourth cladding of the core, the fiber profile proposed by the invention allows, for a given DOS value, either to reduce the bending losses and/or the effective cut-off wavelength whilst maintaining equivalent effective surface and index differences between the central core and the first buried cladding, or to increase the effective surface and to reduce the index differences between the central core and the first buried cladding whilst maintaining equivalent cut-off wavelength and bending losses. The fiber profile according to the invention also allows to reduce the DOS value for a given compromise between bending losses, cut-off wavelength, index differences between the central core and the first buried cladding and the effective surface.

Figure 1:
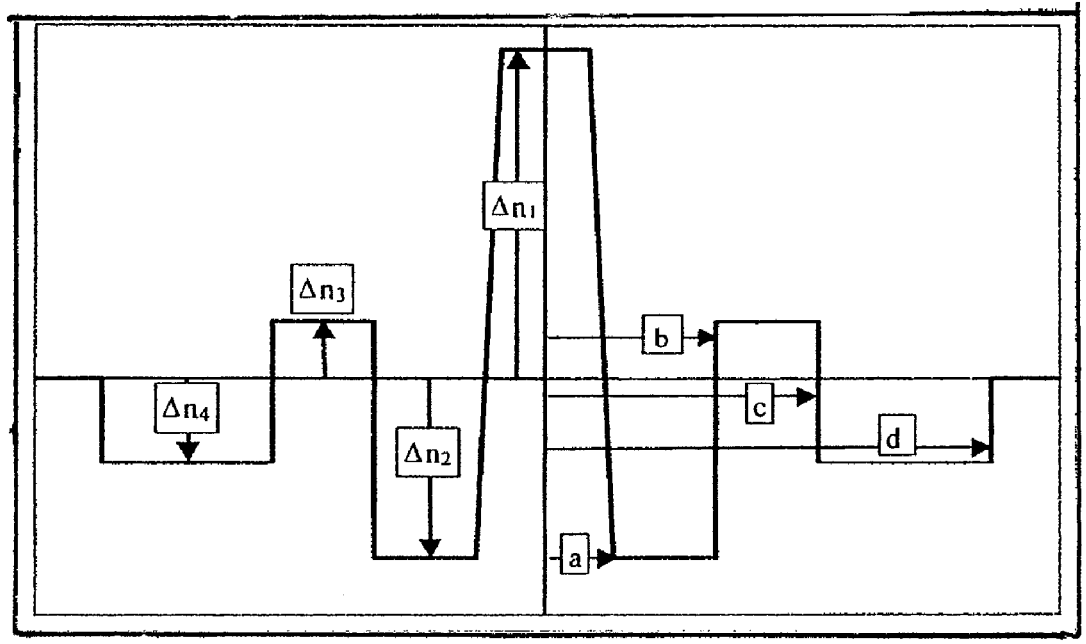
FIG. 1, a graphic representation of the reference profile of a dispersion compensating fiber according to a first embodiment of the invention.
Figure 2:
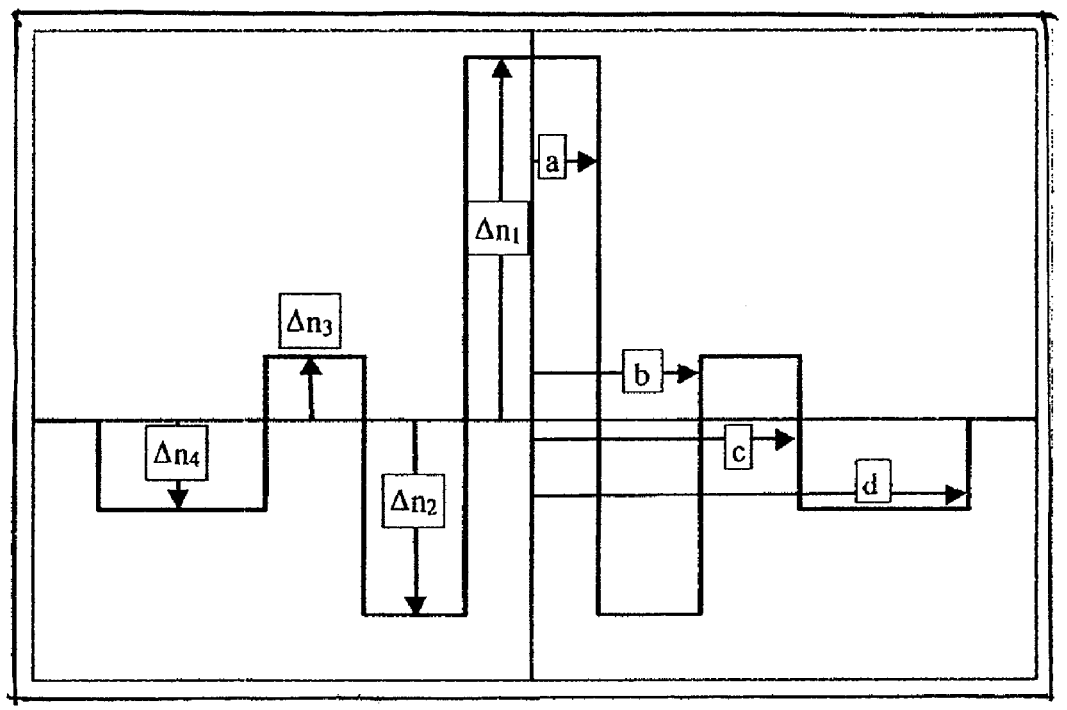
FIG. 2, a graphic representation of the reference profile of a dispersion compensating fiber according to a second embodiment of the invention.
Figure 3:
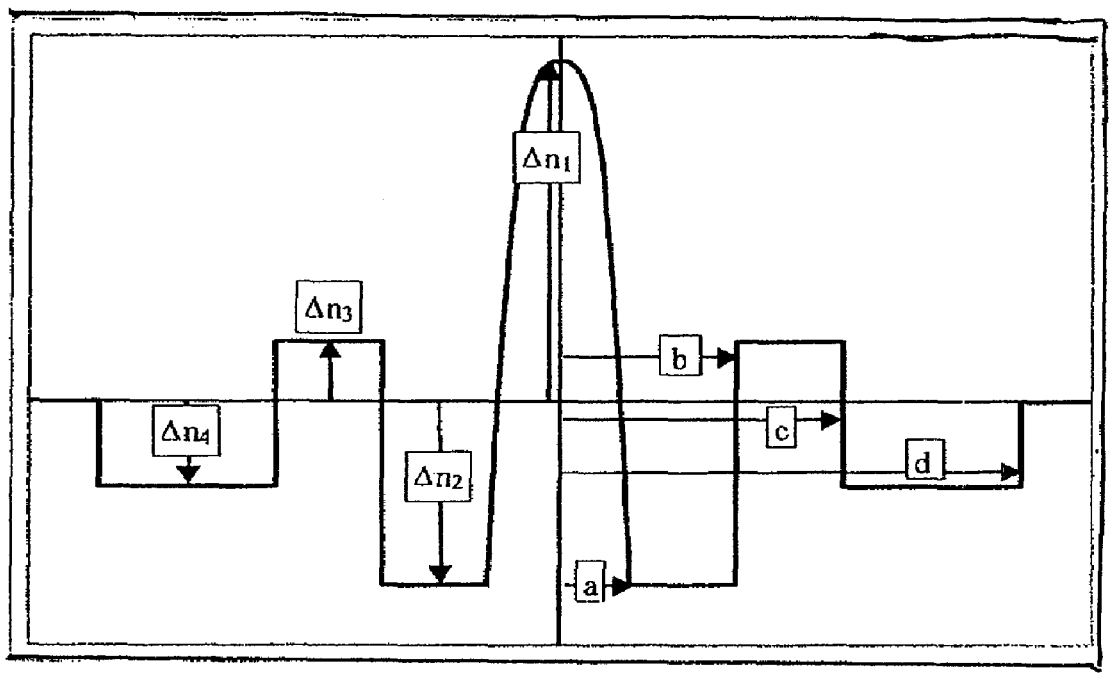
FIG. 3, a graphic representation of the reference profile of a dispersion compensating fiber according to a third embodiment of the invention.

FIGS. 1 to 3 illustrate three index profiles for a dispersion compensating fiber according to the invention. The illustrated shapes are reference profiles, meaning representatives of the theoretical profile of the fiber, the fiber actually obtained after drawing of a preform can have a substantially different profile.

The compensating fiber according to the invention comprises a central core having a positive index difference $\Delta n_1$ with an outer optical cladding, a first buried inner cladding and having a negative index difference $\Delta n_2$ with the outer cladding, a ring having a positive index difference $\Delta n_3$ with the outer cladding and a second buried inner cladding and having a negative index difference $\Delta n_4$ with the outer cladding. It is noted that the outer cladding is the optical cladding.

FIG. 1 illustrates an index profile with a trapezoid-shaped central core with a summit of value $\Delta n_1$ and a base of value $\Delta n_2$. The ratio of the wider bases over the summit of the trapezoid shape of the central core is 0.65. According to the alternative embodiments, the index value $\Delta n_1$ of the central core can be between $23.10^{-3}$ and $35.10^{-3}$, the index value $\Delta n_2$ of the first buried cladding is less than $-13.5.10^{-3}$, the index value $\Delta n_3$ of the ring can be between $2.10^{-3}$ and $9.10^{-3}$, the index value $\Delta n_4$ of the second buried cladding is less than $-3.10^{-3}$.

FIG. 2 illustrates an index profile with a step-shaped central core with a summit of value $\Delta n_1$ and a base of value $\Delta n_2$. According to the alternative embodiments, the index value $\Delta n_1$ of the central core can be between $20.10^{-3}$ and $32.10^{-3}$, the index value $\Delta n_2$ of the first buried cladding is less than $-13.5.10^{-3}$, the index value $\Delta n_3$ of the ring can be between $2.10^{-3}$ and $9.10^{-3}$, the index value $\Delta n_4$ of the second buried cladding is less than $-3.10^{-3}$.

FIG. 3 illustrates an index profile with a central core satisfying an alpha function, with alpha equal to three. An alpha function is defined, in a known manner, as follows:

$$\Delta n_{core} = \Delta n_1 - (\Delta n_1 - \Delta n_2) \cdot (r/a)^\alpha$$

According to the alternative embodiments, the index value $\Delta n_1$ of the central core can be between $27.10^{-3}$ and $39.10^{-3}$, the index value $\Delta n_2$ of the first buried cladding is less than $-13.5.10^{-3}$, the index value $\Delta n_3$ of the ring can be between $2.10^{-3}$ and $9.10^{-3}$ and the index value $\Delta n_4$ of the second buried cladding is less than $-3.10^{-3}$.

According to the invention, the index profile of the dispersion compensating fiber comprises two buried inner claddings. Theses buried claddings are separated by a ring. The term buried cladding means a radial portion of the fiber having a refractive index less than the index of the outer optical cladding. Likewise, the term ring means a radial portion of the fiber having a refractive index greater than the index of the outer optical cladding. Usually, the outer cladding is made of silica but this cladding can be doped to increase or reduce its refractive index, for example to modify the propagation characteristics of the signal.

To define a fiber index profile, it is usual to use the index value of the outer cladding as a reference. The index values of the central core, of the buried claddings and of the ring are thus presented as index differences $\Delta n_{1,2,3,4}$ respectively.

The compensating fiber according to the invention has two deeply buried inner claddings; in particular the index difference between the first buried cladding and the outer cladding $\Delta n_2$ is less than or equal to $-13.5.10^{-3}$ to obtain a DOS of about 50 nm and the index difference between the second buried cladding and the outer cladding $\Delta n_4$ is less than or equal to $-3.10^{-3}$ to obtain the best compromise between the bending losses, the effective cut-off wavelength, the effective surface and the index difference between the central core and the first buried cladding. The first buried cladding, adjacent to the central core, is also defined in relation to the index value of the central core $\Delta n_1$; in particular the index difference between the central core and the first buried cladding $neq = \Delta n_1 - \Delta n_2$ has an impact on the effective surface of the fiber and on the losses. The fiber according to the invention has an index difference between the central core and the first buried cladding $\Delta_{neq}$ which can be between $35.10^{-3}$ and $51.10^{-3}$. Further increasing the value $\Delta_{neq}$ has a negative impact on the effective surface that decreases and on the losses that increase for equivalent dispersive characteristics of the fiber (chromatic dispersion and DOS).

These index values of the buried claddings allow to correctly differentiate the fiber of the invention from the fibers of the prior art also having a second buried inner cladding, in particular the fiber disclosed in the aforementioned documents EP-A-1 308 756 and EP-A-1 170 604. Indeed, the second burried claddings of the fiber profiles described in these documents do not have as high an index difference with the outer cladding in absolute value as $3.10^{-3}$. The index difference values are given as percentages in these documents of the prior art. Nonetheless, if we consider the following formula:

$$\Delta n^4(\%) = \Delta n^4/ng;$$

one obtains, for the examples cited in the document EP-A-1 308 756, a value for $\Delta n_4$ between $-0.87 \cdot 10^{-3}$ and $-1,46 \cdot 10^{-3}$. This document therefore does not disclose a second deeply buried inner cladding with an index difference $\Delta n_4$ less than or equal to $-3 \cdot 10^{-3}$.

The table I below illustrates the characteristics of several possible index profiles for a compensating fiber according to the invention. The first column attributes a reference to each simulation, the letter T making reference to a "three slice in the core" shape, that meaning without any second buried inner cladding, and the letter Q making reference to a "four slice in the core" shape in order to demonstrate the improvements generated by the second buried inner cladding, when it is sufficiently buried. The second column of the table specifies the shape types of the central core, such as defined in reference to FIGS. 1 to 3.

The third to sixth columns display the radius values of each section; and the seventh to tenth columns display the index difference values with the outer cladding for each section, as aforementioned in reference to FIGS. 1 to 3. The relative index values are measured at the wavelength of 633 nm.

The examples $TC_1$, $TC_2$, $TC_3$ and $TC_4$ are comparative examples not according to the present invention, i.e. an index profile without any second buried inner cladding; examples QC1 and QC10 are comparative examples not according to the present invention because the value of $\Delta n_4$ is too high and example QC15 is also a comparative example because the value of $\Delta n_2$ is too high.

NZDSF+ type line fibre. In particular, the fibre according to the invention has, for a wavelength of 1550 nm, a negative chromatic dispersion less than or equal to $-50$ ps/nm/km and a ratio of the chromatic dispersion over the chromatic dispersion slope (DOS) less than or equal to 70 nm. More specifically, the fibre according to the invention can have a negative chromatic dispersion less than or equal to $-100$ ps/nm/km and a DOS less than or equal to 55 nm; it is therefore adapted to perfectly compensate the line fibres having a DOS of 50 nm with a positive chromatic dispersion and a positive dispersion slope.

Furthermore, the applicant noticed that adding a second buried inner cladding having a high index difference with the outer cladding $\Delta n_4$ allows to attain a better compromise between a small DOS value and acceptable optical characteristics (bending losses, cut-off wavelength, effective surface, figure of merit).

The table II below illustrates the compensating optical fibre characteristics corresponding to the index profiles in table I. The first column takes the references from the first column in table I. The following columns supply, for each simulated profile, the values of the chromatic dispersion C, the ratio of the chromatic dispersion over the dispersion slope DOS, the effective surface Aeff, the effective cut-off wavelength $\lambda_{Ceff}$, the bending losses BL and the figure of merit FOM values.

The values of the chromatic dispersion C, the DOS, the FOM and the effective surface $A_{eff}$ are given at a wavelength of 1550 nm. The cut-off wavelength $\lambda_{Ceff}$ corresponds to the wavelength above which the optical signal becomes single-

TABLE I

| profiles | Central core shape | a (μm) | b (μm) | c (μm) | d (μm) | $\Delta n_1$ ($10^{-3}$) | $\Delta n_2$ ($10^{-3}$) | $\Delta n_3$ ($10^{-3}$) | $\Delta n_4$ ($10^{-3}$) | $\Delta n_{eq}$ ($10^{-3}$) |
|---|---|---|---|---|---|---|---|---|---|---|
| TC1 | trapezoid (r = 0.65) | 1.9 | 4.1 | 6.5 | 10.6 | 27.7 | −26.9 | 8.0 | — | 54.6 |
| TC2 | trapezoid (r = 0.65) | 1.8 | 4.5 | 7.3 | 11.1 | 27.1 | −14.4 | 5.5 | — | 41.5 |
| QC1 | trapezoid (r = 0.65) | 1.9 | 4.7 | 7.1 | 14.3 | 26.6 | −20.6 | 8.7 | −1.0 | 47.2 |
| QC2 | trapezoid (r = 0.65) | 1.9 | 4.6 | 12.1 | 14.6 | 24.1 | −15.3 | 2.8 | −10.0 | 39.4 |
| QC3 | trapezoid (r = 0.65) | 1.7 | 5.4 | 9.6 | 14.6 | 27.2 | −14.3 | 5.2 | −7.0 | 41.5 |
| QC4 | trapezoid (r = 0.65) | 1.7 | 5.5 | 9.9 | 14.6 | 27.3 | −14.1 | 5.0 | −8.5 | 41.4 |
| QC5 | trapezoid (r = 0.65) | 1.7 | 5.7 | 10.0 | 14.6 | 27.2 | −14.2 | 5.2 | −10.0 | 41.4 |
| QC6 | trapezoid (r = 0.65) | 1.8 | 5.2 | 9.2 | 14.5 | 27.2 | −14.8 | 6.2 | −8.4 | 42.0 |
| QC7 | trapezoid (r = 0.65) | 1.7 | 5.1 | 9.6 | 14.4 | 27.3 | −13.9 | 5.1 | −9.0 | 41.2 |
| QC8 | trapezoid (r = 0.65) | 1.7 | 5.1 | 9.5 | 14.4 | 27.3 | −13.9 | 5.0 | −7.0 | 41.2 |
| QC9 | trapezoid (r = 0.65) | 1.7 | 5.1 | 9.3 | 14.4 | 27.3 | −13.9 | 5.0 | −5.0 | 41.2 |
| QC10 | trapezoid (r = 0.65) | 1.8 | 4.5 | 7.8 | 14.6 | 27.2 | −15.0 | 5.3 | −1.0 | 42.2 |
| QC11 | trapezoid (r = 0.65) | 1.8 | 4.9 | 8.5 | 14.6 | 27.09 | −14.9 | 5.6 | −3.0 | 42.0 |
| QC12 | trapezoid (r = 0.65) | 1.7 | 5.1 | 9.3 | 14.6 | 27.27 | −14.1 | 5.0 | −5.0 | 41.4 |
| QC13 | trapezoid (r = 0.65) | 1.8 | 5.2 | 8.8 | 14.6 | 26.9 | −15.3 | 6.1 | −3.0 | 42.2 |
| QC14 | trapezoid (r = 0.65) | 1.7 | 5.5 | 9.8 | 14.6 | 27.29 | −13.6 | 5.0 | −5.0 | 40.9 |
| QC15 | trapezoid (r = 0.65) | 1.7 | 6.1 | 10.4 | 14.6 | 27.1 | −11.2 | 5.4 | −7.5 | 38.3 |
| TC3 | Step | 1.5 | 3.8 | 6.5 | 10.4 | 30.0 | −30.0 | 7.0 | — | 60.0 |
| QC16 | Step | 1.6 | 5.4 | 8.8 | 14.3 | 23.3 | −15.0 | 6.9 | −6.0 | 38.3 |
| QC17 | Step | 1.5 | 5.0 | 9.3 | 14.0 | 23.9 | −15.0 | 5.3 | −8.5 | 38.9 |
| QC18 | Step | 1.5 | 4.8 | 9.5 | 13.6 | 24.5 | −15.0 | 5.1 | −10.0 | 39.5 |
| TC4 | alpha (=3) | 1.9 | 4.1 | 6.0 | 9.9 | 35.0 | −30.0 | 11.1 | — | 65.0 |
| QC19 | alpha (=3) | 1.9 | 5.5 | 9.8 | 14.6 | 28.0 | −14.1 | 5.1 | −8.1 | 42.1 |
| QC20 | alpha (=3) | 1.9 | 5.3 | 8.5 | 14.6 | 28.7 | −15.0 | 7.4 | −6.0 | 43.7 |
| QC21 | alpha (=3) | 1.9 | 5.0 | 9.7 | 14.3 | 28.0 | −14.0 | 4.9 | −9.5 | 42.0 |

The compensating fiber according to the invention, having an index profile such as previously described, has a negative chromatic dispersion and a negative chromatic dispersion slope adapted to compensate for the positive chromatic dispersion and the positive chromatic dispersion slope of a mode after propagation over two meters of fibre. The bending losses BL values are given at a wavelength of 1625 nm for a curvature radius of the fibre of 10 mm. The figure of merit FOM is defined as the ratio of the chromatic dispersion C, in absolute value, over the signal attenuation in dB/km.

TABLE II

| Shapes | C (ps/nm/km) | DOS (nm) | $A_{EFF}$ (µm²) | $\lambda_{ceff}$ (nm) | $BL_{R=10\,mm}@1625$ nm(dB/m) | FOM (ps/nm/dB) |
|---|---|---|---|---|---|---|
| TC1 | −100 | 50 | 14.1 | ~1630 | <500 | <100 |
| TC2 | −100 | 85 | 15.8 | ~1600 | <200 | 100 < FOM < 150 |
| QC1 | −100 | 50 | 14.9 | ~1630 | <500 | <100 |
| QC2 | −100 | 50 | 16.7 | ~1630 | <500 | 100 < FOM < 150 |
| QC3 | −100 | 53 | 15.1 | ~1600 | <200 | 100 < FOM < 150 |
| QC4 | −100 | 50 | 15.1 | ~1600 | <200 | 100 < FOM < 150 |
| QC5 | −100 | 45 | 15.0 | ~1600 | <200 | 100 < FOM < 150 |
| QC6 | −120 | 50 | 15.5 | ~1630 | <100 | 100 < FOM < 150 |
| QC7 | −150 | 50 | 15.9 | ~1600 | <200 | >150 |
| QC8 | −150 | 50 | 15.9 | ~1600 | <200 | >150 |
| QC9 | −150 | 50 | 15.9 | ~1600 | <500 | >150 |
| QC10 | −100 | 80 | 15.6 | ~1570 | <200 | 100 < FOM < 150 |
| QC11 | −100 | 65 | 15.4 | ~1600 | <200 | 100 < FOM < 150 |
| QC12 | −100 | 60 | 15.3 | ~1600 | <200 | 100 < FOM < 150 |
| QC13 | −100 | 50 | 15.2 | ~1625 | <500 | 100 < FOM < 150 |
| QC14 | −100 | 50 | 15.2 | ~1625 | <500 | 100 < FOM < 150 |
| QC15 | −100 | 50 | 15.8 | ~1625 | <500 | 100 < FOM < 150 |
| TC3 | −100 | 51 | 12.7 | ~1630 | <500 | <100 |
| QC16 | −100 | 50 | 16.8 | ~1600 | <200 | 100 < FOM < 150 |
| QC17 | −150 | 50 | 17.3 | ~1580 | <200 | >150 |
| QC18 | −200 | 50 | 17.8 | ~1600 | <200 | >150 |
| TC4 | −100 | 51 | 12.6 | ~1600 | <500 | <100 |
| QC19 | −100 | 50 | 16.3 | ~1580 | <200 | 100 < FOM < 150 |
| QC20 | −150 | 50 | 16.9 | ~1570 | <200 | >150 |
| QC21 | −200 | 50 | 18.2 | ~1570 | <200 | >150 |

It is noted in this table II that for the set of compensating fiber profiles according to the invention the chromatic dispersion at 1550 nm varies from −100 to −200 ps/nm/km and the DOS is less than 70 nm, most examples being about 50 nm. It is also noted that the compensating fiber according to the invention has an effective surface greater than or equal to 14 µm².

It is also noted in table II that for the set of profiles, the effective cut-off wavelength is between 1570 and 1630 nm and that the bending losses over a curvature radius of 10 mm at the wavelength of 1625 nm are less than 500 dB/m, even frequently less than 200 dB/m.

In can be observed that the fibers having trapezoid-shape central cores TC1, QC1 and QC2 have at 1625 nm bending losses less than or equal to 500 dB/m and an effective cut-off wavelength of about 1630 nm for a same DOS of 50 nm. In was also observed that the fiber corresponding to the QC2 profile has a larger effective surface. It was also noted that by comparing the TC1 and QC2 profiles the making of a second deeply buried cladding improves the FOM because it allows to reduce the index difference $\Delta n_{eq}$ in the central part of the core, where the field proportion is high, which decreases the optical losses.

The same observations can be made for the fibers having step-shape profiles TC3 and QC16 and for fibers having alpha-shape index profiles TC4 and QC19. Thus, the adding of a second deeply buried cladding allows to improve the optical characteristics of the fiber.

Furthermore, it can be concluded from table II that the fibers having step-shape index profiles QC16 and QC18 have at 1625 nm bending losses less than or equal to 200 dB/m and an effective cut-off wavelength of about 1600 nm for a same DOS of 50 nm. It was also noted that the fiber corresponding to the QC18 profile has a smaller chromatic dispersion (100 ps/nm/km less than that of the QC16 profile) and a larger effective surface (1 µm² more that that of the QC16 profile). An increase of the burying of the fourth cladding of the core therefore improves the FOM by reducing the chromatic dispersion and increases the effective surface whilst maintaining an equivalent index difference in the central part of the core.

The same observations can be made for the fibers having alpha-shape index profiles QC20 and QC21 and for the fibers having trapezoid-shape index profiles QC4 and QC7. Thus, an increase in the burying of the fourth cladding of the core allows to improve the optical characteristics of the fiber.

It can thus be concluded from table II that the compensating fiber according to the invention has a figure of merit greater than or equal to 100 ps/nm/dB and preferably greater than 150 ps/nm/dB as soon as the second buried inner cladding is sufficiently deeply buried.

Figure 4:
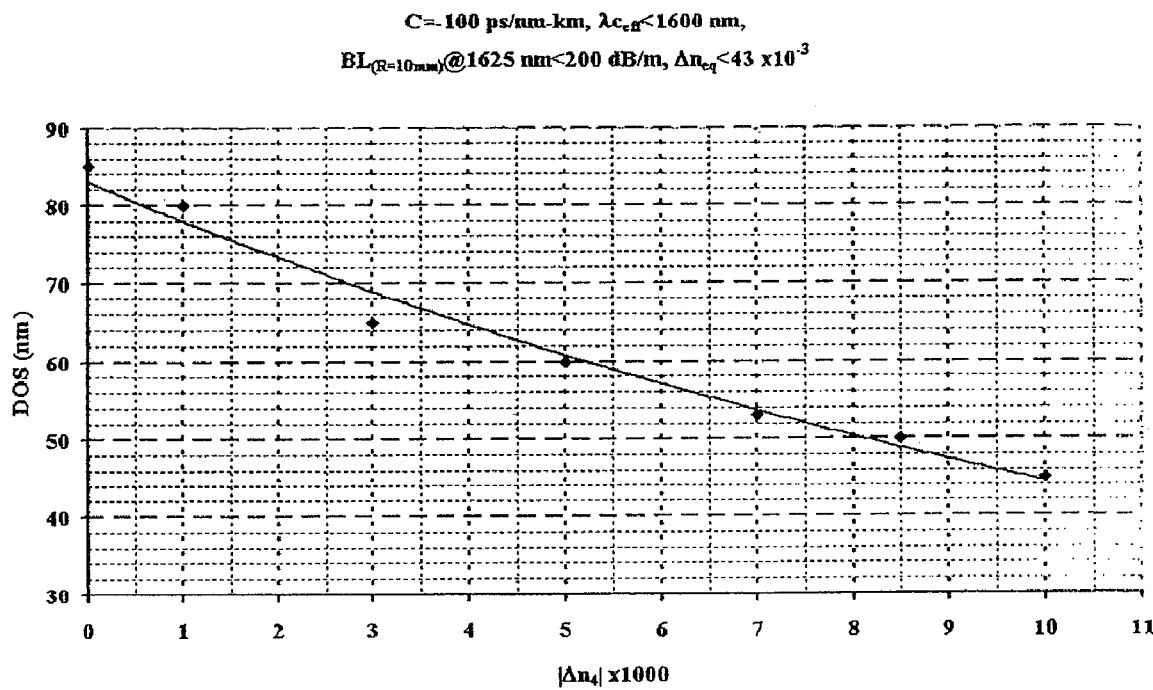
FIG. 4, a graph illustrating the value of the ratio of the chromatic dispersion over the dispersion slope (DOS) as a function of the index value of the second buried cladding for a fiber profile according to the invention meeting the criteria of a chromatic dispersion equal to −100 ps/nm/km, of an cut-off wavelength less than 1600 nm, of bending losses less than 200 dB/m at a wavelength of 1625 nm and an index difference between the central core and the first buried cladding less than 43.10-3.
Figure 5:
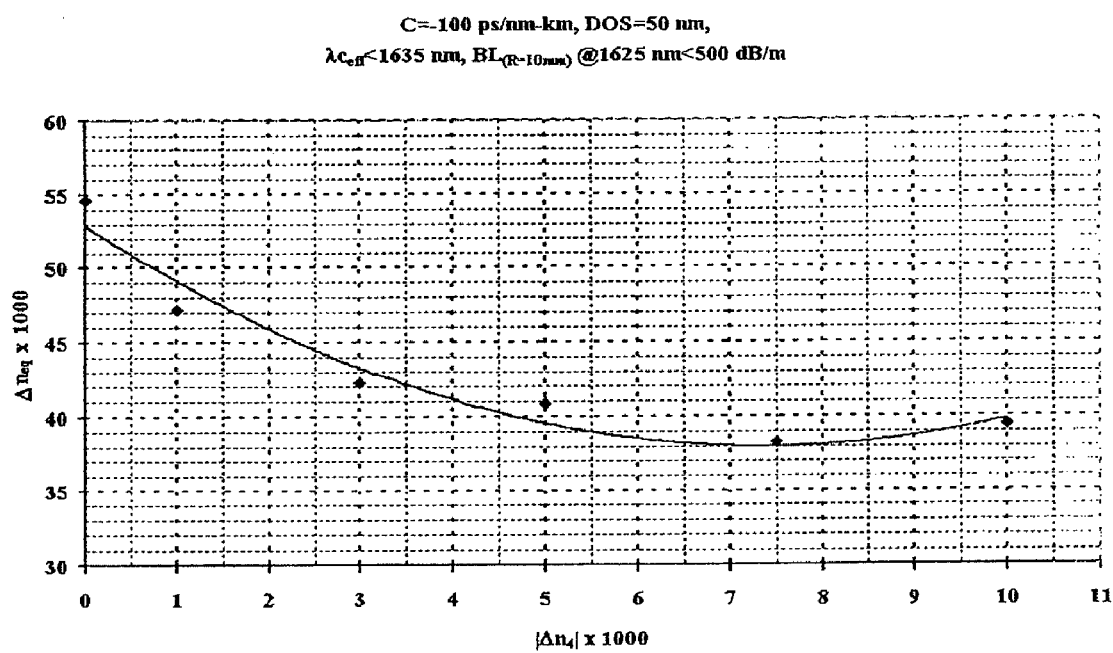
FIG. 5, a graph illustrating the index difference between the central core and the first buried cladding as a function of the index value of the second buried cladding for a fiber profile according to the invention meeting the criteria of a chromatic dispersion equal to −100 ps/nm/km, of a cut-off wavelength less than 1635 nm, of bending losses less than 500 dB/m at a wavelength of 1625 nm and a DOS value equal to 50 nm.

The graphs in FIGS. 4 and 5 better illustrate the impact of the second buried inner cladding on the optical characteristics of the compensating fiber.

FIG. 4 is a graph illustrating the value of the ratio of the chromatic dispersion over the dispersion slope (DOS) as a function of the index value of the second buried cladding.

To measure the DOS by varying the value of $\Delta n_4$, an index difference is imposed between the central core and the first buried inner cladding $\Delta n_{eq}$ less than $43.10^{-3}$ and a chromatic dispersion is set at equal to −100 ps/nm/km, a cut-off wavelength is set at less than 1600 nm and bending losses are set at less than 200 dB/m.

It can be clearly seen in FIG. 4 that the more buried the second inner cladding is, that meaning the greater the absolute value of $\Delta n_4$ is, the more the value of the DOS is reduced.

Furthermore, FIG. 5 is a graph illustrating the index difference between the central core and the first buried cladding $\Delta n_{eq}$ as a function of the index value of the second buried cladding. As for the graph in FIG. 5, a chromatic dispersion is set at equal to −100 ps/nm/km, a DOS value is set at equal to 50 nm, a cut-off wavelength is set at less than 1635 nm and bending losses are set at less than 500 dB/m.

It can be seen in FIG. 5 that a value of $\Delta n_4$ greater, in absolute value, than $3.10^{-3}$ allows to minimise the index difference between the central core and the first buried cladding $\Delta n_{eq}$, which allows to minimise the losses and therefore increase the FOM.

The compensating fiber according to the invention can be manufactured via drawing a preform having one of the aforementioned index profiles. Such preform profiles can be made, for example, from a tube of silica into which doped layers of silica are deposited. The depositing can be performed via modified chemical vapor deposition (MCVD) and/or plasma chemical vapor deposition (PCVD). The chemical deposit in the form of vapour activated by PCVD plasma is especially suitable for making layers of buried cladding.

The compensating fiber according to the invention can be used in a compensating module in a high bit-rate and long distance transmission system.

Such a transmission system traditionally has an optical signal transmitter in a predetermined range of wavelengths, for example in the C-Band or the L-Band, and a transmission optical fiber, such as a NZDSF or an e-leaf®. The line fiber has in the considered range of wavelengths a positive chromatic dispersion and a positive chromatic dispersion slope with a DOS of about 50 nm. The system can also include, in a module, a section of the compensating fiber according to the invention, without requiring a coupling with an additional fiber. The module of the invention only contains a single fiber composed of the aforementioned fiber of the invention. The design of the module is thus simplified and its cost reduced.

The invention claimed is:

1. A dispersion compensating optical fiber comprising:
a central core having an index difference $\Delta n_1$ with an outer optical cladding;
a first buried inner cladding having an index difference $\Delta n_2$ with the outer cladding;
a ring having an index difference $\Delta n_3$ with the outer cladding
a second buried inner cladding having an index difference $\Delta n_4$ with the outer cladding;
wherein the index difference between the first buried inner cladding and the outer cladding $\Delta n_2$ is less than or equal to $-13.5 \times 10^{-3}$ and the index difference between the second buried inner cladding and the outer cladding $\Delta n_4$ is less than or equal to $-3 \times 10^{-3}$;
the fiber having, at a wavelength of 1550 nm:
a negative chromatic dispersion being less than or equal to $-50$ ps/nm/km; and
a ratio of chromatic dispersion over the slope of the chromatic dispersion (DOS) being less than or equal to 70 mm.

2. The fiber of claim 1, having at a wavelength of 1550 nm a chromatic dispersion being less than or equal to $-100$ ps/nm/km.

3. The fiber of claim 1, having at a wavelength of 1550 nm a ratio of chromatic dispersion over the slope of the chromatic dispersion (DOS) being less than or equal to 55 nm.

4. The fiber of claim 1, wherein the index difference between the central core and the first buried inner cladding $\Delta n_{eq} = \Delta n_1 - \Delta n_2$ is in a range from $35.10 \times 10^{-3}$ to $51 \times 10^{-3}$.

5. The fiber of claim 1, wherein the effective surface for the fundamental of propagation is more than or equal to 12 µm².

6. The fiber of claim 5, wherein the effective surface for the fundamental of propagation is more than or equal to 14 µm².

7. The fiber of claim 1, wherein the effective cut-off wavelength is less than or equal to 1650 nm.

8. The fiber of claim 1, wherein the bending losses at a wavelength of 1625 nm for a curvature radius of 10 mm are less than or equal to 500 dB/m.

9. The fiber of claim 8, wherein the bending losses at a wavelength of 1625 nm for a curvature radius of 10 mm are less than or equal to 200 dB/m.

10. The fiber of claim 1, wherein the figure of merit at a wavelength of 1550 nm is more than or equal to 100 ps/rn/dB.

11. The fiber of claim 10, wherein the figure of merit at a wavelength of 1550 nm is more than or equal to 150 ps/nm/dB.

12. The fiber of claim 1, wherein the central core has a trapezoid shape.

13. The fiber of claim 1, wherein the central core has a step shape.

14. The fiber of claim 1, wherein the central core has an alpha shape.

15. A transmission system comprising:
an optical transmitter emitting optical signals in a predetermined range of wavelength;
a transmission optical fiber having for said predetermined range of wavelength a positive chromatic dispersion and a positive dispersion slope with a ratio of chromatic dispersion over the slope of the chromatic dispersion (DOS) being less than or equal to 70 nm;
the dispersion compensating fiber of claim 1.

16. The system of claim 15, wherein the transmission optical fiber is a NZDSF+.

17. A chromatic dispersion compensating module for transmission optical fiber having in a predetermined range of wavelengths a positive chromatic dispersion and a positive chromatic dispersion slope with a ratio of chromatic dispersion over the chromatic dispersion slope (DOS) of less than or equal to 70 nm, the module containing a single fiber consisting in a portion of the fiber of claim 1.

* * * * *